US012767557B2

(12) United States Patent
Han et al.

(10) Patent No.: US 12,767,557 B2
(45) Date of Patent: Oct. 20, 2026

(54) LITHIUM COMPOSITE OXIDE AND POSITIVE ELECTRODE ACTIVE MATERIAL FOR SECONDARY BATTERY CONTAINING SAME

(71) Applicant: ECOPRO BM CO., LTD., Cheongju-si (KR)

(72) Inventors: Kyu Suk Han, Cheongju-si (KR); Jin Hyeok Choi, Cheongju-si (KR); Jae Hoon Shin, Cheongju-si (KR); Seul Gi Lee, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 741 days.

(21) Appl. No.: 18/321,553

(22) Filed: May 22, 2023

(65) Prior Publication Data

US 2024/0145683 A1 May 2, 2024

(30) Foreign Application Priority Data

Oct. 31, 2022 (KR) ........................ 10-2022-0143043

(51) Int. Cl.
*H01M 4/36* (2006.01)
*C01G 53/00* (2025.01)
(Continued)

(52) U.S. Cl.
CPC ........... *C01G 53/506* (2025.01); *C01G 53/82* (2025.01); *H01M 4/1315* (2013.01); *H01M 4/366* (2013.01); *H01M 4/505* (2013.01); *H01M 4/525* (2013.01); *C01P 2002/54* (2013.01); *C01P 2002/60* (2013.01); *C01P 2002/88* (2013.01); *C01P 2004/03* (2013.01); *C01P 2004/50* (2013.01); *C01P 2004/61* (2013.01); *C01P 2004/62* (2013.01); *C01P 2004/84* (2013.01); *C01P 2006/40* (2013.01); *H01M 2004/021* (2013.01); *H01M 2004/028* (2013.01)

(58) Field of Classification Search
None
See application file for complete search history.

(56) References Cited

U.S. PATENT DOCUMENTS 10,141,567 B2 11/2018 Choi et al.
2014/0367609 A1 12/2014 Kapylou et al.

FOREIGN PATENT DOCUMENTS

JP H11-345615 A 12/1999
JP 2000243394 A * 9/2000
(Continued)

OTHER PUBLICATIONS

Fujiwara et al., JP 2000243394, English Translation from FIT, 29 pages (Year: 2000).*
(Continued)

*Primary Examiner* — Colin W. Slifka
(74) *Attorney, Agent, or Firm* — LUCAS & MERCANTI, LLP

(57) ABSTRACT

A positive electrode active material including a lithium nickel-based composite oxide including secondary particles formed by aggregation of one or more primary particles, wherein a part of cations and a part of anions in the lithium nickel-based composite oxide are substituted, respectively, with cations M' and fluorine anions ($F^-$) in a fluorine-based compound.

11 Claims, 8 Drawing Sheets

Comparative Example

Example

(51) Int. Cl.

| | |
|---|---|
| ***C01G 53/506*** | (2025.01) |
| ***C01G 53/82*** | (2025.01) |
| ***H01M 4/02*** | (2006.01) |
| ***H01M 4/1315*** | (2010.01) |
| ***H01M 4/505*** | (2010.01) |
| ***H01M 4/525*** | (2010.01) |

(56) References Cited

FOREIGN PATENT DOCUMENTS

| | | | |
|---|---|---|---|
| JP | 2008-251532 | A | 10/2008 |
| JP | 2014-107269 | A | 6/2014 |
| JP | 2015-130343 | A | 7/2015 |
| JP | 2018-092931 | A | 6/2018 |
| JP | 2020-064849 | A | 4/2020 |
| JP | 2021-068700 | A | 4/2021 |
| KR | 10-2013-0019399 | A | 2/2013 |
| KR | 10-2015-0063956 | A | 6/2015 |
| KR | 10-2015-0099219 | A | 8/2015 |
| KR | 10-1646911 | B1 | 8/2016 |
| KR | 10-2021-0052320 | A | 5/2021 |
| WO | 2022-092488 | A1 | 5/2022 |

OTHER PUBLICATIONS

European Patent Office, “European Search Report”, which was issued for corresponding European Patent Application No. 23175383.1, 11 pages, Apr. 16, 2024.

Wang, Jiale et al., “Strengthened the structural stability of in-situ F-doping Ni-rich LiNi0.8Co0.15Al0.05O2 cathode materials for lithium-ion batteries”, Chemical Engineering Journal, vol. 438, p. 135537, 13 pages, Mar. 2, 2022.

Zhao, Zhiyuan, et al., “Facile synthesis of fluorine doped single crystal Ni-rich cathode material for lithium-ion batteries”, Solid State lonics, vol. 342, p. 115065, 10 pages, Sep. 12, 2019.

Qiu, Zhenping, et al., “Improving the cycling performance of LiNi0.8Co0.15Al0.05O2 cathode materials via zirconium and fluorine co-substitution”, Journal of Alloys and Compounds, vol. 806, pp. 136-145, Jul. 19, 2019.

Zhang, Yafeng, et al., “Superior electrochemical properties of Zirconium and Fluorine co-doped Li1,20 [Mn0.54Ni0.13Co0.13]O2 as cathode material for lithium ion batteries”, Journal of Materials Science: Materials in Electronics, vol. 32, No. 4, pp. 4380-4392, Jan. 12, 2021.

He, Rui, et al., “Electrochemical properties study on NCM622 by in suit modification of Mg and F”, Journal of Physics: Conference Series, vol. 1605, No. 1, p. 012166, 5 p. Aug. 1, 2020.

Office Action, dated Jan. 2, 2025, issued for the corresponding Korean Patent Application No. 10-2022-0143043, 8 pages.

Office Action, dated Mar. 6, 2025, issued for the corresponding Japanese Patent Application No. 2023-089361, 5 pages.

* cited by examiner

Comparative Example

Example

LITHIUM COMPOSITE OXIDE AND POSITIVE ELECTRODE ACTIVE MATERIAL FOR SECONDARY BATTERY CONTAINING SAME

CROSS REFERENCE TO RELATED APPLICATION

This application claims the benefit of priority of Korean Application No. 10-2022-0143043 filed on Oct. 31, 2022, the contents of which are incorporated herein by reference.

BACKGROUND OF THE INVENTION

Field of the Invention

The present invention relates to a lithium nickel-based composite oxide and a positive electrode active material for secondary batteries containing the same and more particularly, to a positive electrode active material, in which a cation and anion are simultaneously substituted with a fluorine-based compound in a crystal structure of a polycrystalline-type lithium nickel-based composite oxide.

Description of the Related Art

The development of portable mobile electronic devices such as cellular phones, MP3 players, and tablets has brought about an explosive increase in demand for secondary batteries capable of storing electrical energy. In particular, with the advent of electric vehicles, medium- and large-sized energy storage systems, and portable devices requiring high energy density, the demand for lithium secondary batteries is increasing.

The lithium composite oxide for a positive electrode active material that has recently been most in the spotlight is lithium nickel manganese cobalt oxide having the formula $Li(Ni_xCo_yMn_z)O_2$ (wherein x, y, and z are atomic fractions of independent oxide composition elements and satisfy $0<x\leq1$, $0<y\leq1$, and $0<z\leq1$, with the proviso of $0<x+y+z\leq1$). This positive electrode active material has advantages of higher capacity than $LiCoO_2$, which has been actively researched and used as a positive electrode active material, and of low price due to lower Co content.

However, such a lithium composite oxide changes volume upon intercalation and deintercalation of lithium ions during charging and discharging. The lithium composite oxide has problems of rapid change in the volume of primary particles of lithium composite oxide during charging and discharging, cracks of secondary particles due to repeated charging and discharging, or collapse of the crystal structure or phase transition of the crystal structure.

The demand for a nickel-rich system (high-nickel-based) positive electrode active material for secondary batteries, having a Ni content of 60% or more, has begun to increase in order to compensate for these disadvantages. However, the active material of such a nickel-rich system has an excellent advantage of high capacity, but has problems of increased structural instability due to Li/Ni cation mixing, as the Ni content increases, and rapid deterioration in lifespan characteristics at room temperature and high temperature due to physical disconnection of internal particles resulting from microcracks and serious electrolyte depletion.

SUMMARY OF THE INVENTION

Therefore, the present invention has been made in view of the above problems and it is one object of the present invention to provide a positive electrode active material that is capable of suppressing cation mixing and enhancing the strength of structure based on fluorine replacing oxygen by substituting a cation and anion in a lithium nickel-based composite oxide, respectively, with a cation M' and a fluorine anion ($F^-$) in a fluorine-based compound.

It is another object of the present invention to provide a positive electrode active material that is capable of controlling the growth of primary particles in the inside and surface portion of secondary particles.

It is another object of the present invention to provide a positive electrode active material that is capable of controlling growth of primary particles in a specific direction in the surface portion distinct from the inside portion of secondary particles.

It is another object of the present invention to provide a positive electrode active material that is capable of greatly reducing lattice defects and residual lithium generated during high-temperature reactions.

It is another object of the present invention to provide a positive electrode active material that is capable of improving the lifespan of a battery and greatly inhibiting gas generation during high-temperature storage.

It is another object of the present invention to provide a positive electrode active material that is capable of greatly improving battery characteristics such as capacity/efficiency and c-rate.

In accordance with the present invention, the above and other objects can be accomplished by the provision of a positive electrode active material including a lithium nickel-based composite oxide including secondary particles formed by aggregation of one or more primary particles, wherein a cation and anion in the lithium nickel-based composite oxide, are substituted, respectively, with a cation M' and a fluorine anion ($F^-$) in a fluorine-based compound.

In one embodiment, the fluorine-based compound may include at least one selected from LiF, $CaF_2$, $MgF_2$, $AlF_3$, and $ZrF_4$.

In one embodiment, the secondary particle includes a surface portion and an inside portion, wherein an average size of primary particles of the surface portion of the secondary particle may be greater than that of the inside portion of the secondary particle.

In one embodiment, primary particles having a size of not less than 200 nm and less than 500 nm in the inside portion of the secondary particle may be present in an amount of 50 to 100% by volume with respect to primary particles constituting the inside portion of the secondary particle.

In one embodiment, primary particles having a size of 500 nm to 10 μm in the surface portion of the secondary particle may be present in an amount of 50 to 100% by volume with respect to primary particles constituting the surface portion of the secondary particle.

In one embodiment, an average aspect ratio of the primary particles in the surface portion of the secondary particle may be greater than an average aspect ratio of the primary particles in the inside portion of the secondary particle.

In one embodiment, 50% or more of the primary particles of the surface portion of the secondary particle may have a long axis at an angle of ±30° or less from a line connecting the surface of the secondary particle to the center of the secondary particle.

In one embodiment, 50% or more of the primary particles of the surface portion of the secondary particle may have a lithium ion diffusion path formed in the primary particle at an angle of ±30° or less from the line connecting the surface of the secondary particle to the center of the secondary particle.

In one embodiment, the secondary particle may have a max peak intensity at 684.3 eV to 685.0 eV as determined by analysis of a fluorine Is binding energy by X-ray photoelectron spectroscopy (XPS).

In one embodiment, the positive electrode active material may further include a coating oxide that occupies at least a part of at least one of the surfaces of the secondary particle, grain boundaries between the primary particles, or surfaces of the primary particles.

In accordance with another aspect of the present invention, provided is a positive electrode including the positive electrode active material.

In accordance with another aspect of the present invention, provided is a secondary battery including the positive electrode.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
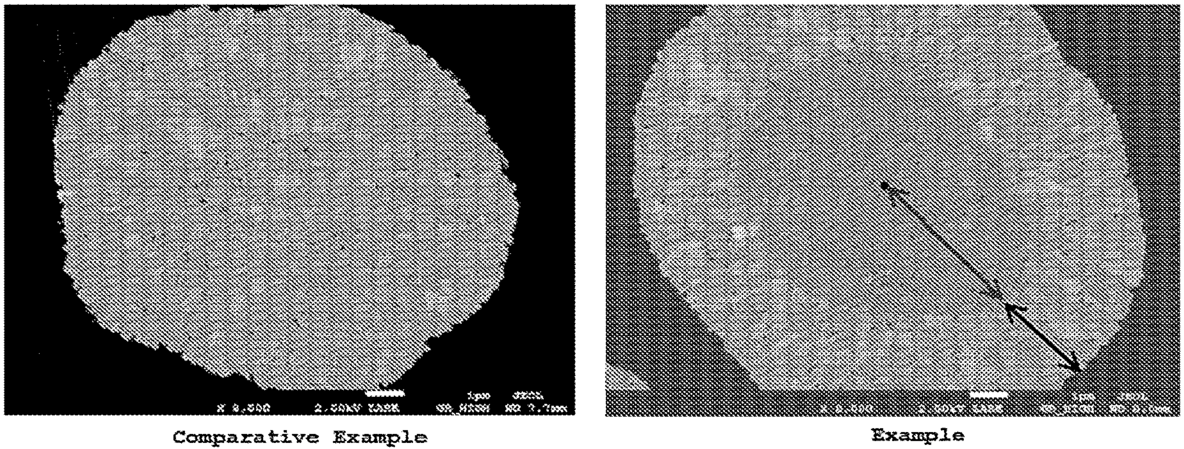
FIG. 1 is a cross-sectional SEM image of positive electrode active materials according to Comparative Examples and Examples of the present invention.

As used herein, terms such as "comprising" are to be understood as open-ended terms that encompass the possibility of including other configurations.

As used herein, the terms "preferred" and "preferably" refer to embodiments of the invention that may provide specific advantages under certain circumstances. However, these terms are not intended to exclude other embodiments from the scope of the present invention.

Also, the singular forms used in the specification and appended claims may be intended to include plural forms as well, unless the context dictates otherwise.

Meanwhile, the technical features described below relate to aspects to obtain the desired effects of the present invention described above.

That is, the positive electrode active material according to one embodiment of the present invention can greatly improve battery characteristics based on the technical characteristics according to one embodiment described below.

The positive electrode active material according to an aspect of the present invention includes secondary particles formed by aggregation of one or more primary particles.

In one embodiment, the primary particle may include one or more crystallites.

The secondary particle may be in the form of a multiparticulate or polycrystal including two or more primary particles. More preferably, the secondary particle may be in the form of a multiparticulate or polycrystal including an aggregate of 20 or more primary particles.

In a further preferred embodiment, the secondary particle may have a grain boundary density of 0.85 or more or 0.90 or more.

As used herein, the grain boundary density is calculated in accordance with the following Equation 1 based on the primary particles placed on a straight line crossing the center of the secondary particle in a uniaxial direction in a cross-sectional SEM image of lithium composite oxide obtained with a scanning electron microscope (SEM) after cross-sectioning the secondary particle:

Grain boundary density=number of grain boundaries between primary particles placed on straight line/number of primary particles placed on straight line [Equation 1]

For example, the grain boundary density of a non-aggregated single-particulate particle composed of one primary particle calculated in accordance with Equation 1 may be zero. In addition, when two primary particles are aggregated, the grain boundary density thereof calculated in accordance with Equation 1 may be 0.5.

At this time, the grain boundary density means an average of grain boundary densities obtained from primary particles on 10 arbitrary straight lines.

In an embodiment, the average particle size of the secondary particles may be 1 μm to 30 μm, more preferably 8 μm to 20 μm.

Meanwhile, as used herein, the term "average particle size" means an average diameter (D50) when the particles are spherical and means a length of an average long axis when the particles are non-spherical. In the present invention, the average particle size of the secondary particles was measured using a particle size analyzer (Cilas) and SEM. In addition, the average particle size of the primary particle was calculated by measuring the length of the long axis of the primary particle when the particle has a rod shape in the SEM image, and the average particle size of the primary particle was calculated by measuring an average of the diameter when the particle has a spherical shape in the SEM image. In addition, the crystallite size was measured in accordance with the Scherrer equation using the θ value and the half width obtained by XRD analysis.

The present invention provides a unimodal-type positive electrode active material. In addition, in another further preferable embodiment, the positive electrode active material may be a bimodal-type positive electrode active material further including lithium composite oxide second particles having an average particle size of 7 μm or less, which is different from that of the secondary particle.

The lithium composite oxide according to one embodiment of the present invention may be a lithium nickel-based composite oxide containing lithium, nickel and oxygen.

In one embodiment, the lithium nickel-based composite oxide may further contain cobalt.

In one embodiment, the lithium nickel-based composite oxide may further contain lithium, nickel and aluminum.

In one embodiment, the lithium nickel-based composite oxide may further contain lithium, nickel and manganese.

In one embodiment, the lithium nickel-based composite oxide may be a high-nickel-based lithium composite oxide containing nickel in an amount of 0.5 mol % or more, 0.6 mol % or more, 0.7 mol % or more, 0.8 mol % or more, or 0.9 mol % or more, based on the total molar content of the transition metal.

Some cations and anions in the lithium nickel-based composite oxide according to one embodiment of the present invention are simultaneously substituted with the cation M' and the fluorine anion contained in the fluorine-based compound. The cation M' and the fluorine anion of the fluorine-based compound may be present in the lattice structure of the primary particle contained in the lithium nickel-based composite oxide particle, which may be expressed as the fluorine-based compound being doped, and the fluorine-based compound acting as a dopant.

According to the present invention, battery characteristics such as lifespan and high-temperature storage can be maximized by simultaneously substituting the cation and anion sites of the lithium nickel-based composite oxide with the fluorine-based compound. More specifically, fluorine has a higher electronegativity than oxygen and thus has a stronger bonding force with a transition metal such as Ni, thereby increasing structural stability and maximizing battery characteristics. The cation of fluorine-based compound has an effect of suppressing cation mixing. Based on these effects, the present invention can maximize battery characteristics such as lifespan and high-temperature storage.

In one embodiment, the cation M' of the fluorine-based compound may include at least one selected from cations of alkali metals, alkaline earth metals, transition metals, and rare earth metals.

More preferably, the fluorine-based compound may be LiF, $CaF_2$, $MgF_2$, $AlF_3$ or $ZrF_4$.

Most preferably, the fluorine-based compound may be LiF or $CaF_2$. LiF is highly effective in suppressing cation mixing by excess Li, strengthening the structure based on fluorine replacing oxygen, and suppressing gas generation during high-temperature storage. In $CaF_2$, Ca has a large ionic radius and mainly enters the lithium site and has the effect of enhancing thermal stability.

This effect is also greatly affected by the doping content of the fluorine-based compound and the present inventors dramatically improved the lifespan and high-temperature storage characteristics by controlling all of the specific process, doping material, and doping content of the present invention.

A lithium nickel-based composite oxide according to an embodiment of the present invention is doped with a fluorine-based compound and may be represented by Formula 1 below.

$$Li_aNi_xCo_yM_zM'_{1-x-y-z}O_{2-q}F_q \quad \text{[Formula 1]}$$

wherein M is selected from the group consisting of Al, Mn, B, Ba, Ce, Cr, F, Mg, V, Ti, Fe, Zr, Zn, Si, Y, Nb, Ga, Sn, Mo, W, P, and Sr, and combinations thereof, M' includes at least one selected from cations of alkali metals, alkaline earth metals, transition metals and rare earth metals, and a, x, y, z, and q satisfy $0.9 \le a \le 1.3$, $0.5 \le x \le 1.0$, $0.0 \le y \le 0.2$, $0.0 \le z \le 0.2$, and $0.0 < q \le 0.1$, respectively.

In one embodiment, the nickel-based lithium composite oxide may be represented by Formula 2 below:

$$Li_{a'}Ni_{x'}Co_{y'}M1_{z'}M2_{t'}M'_{1-x'-y'-z'-t'}O_{2-q'}F_{q'} \quad \text{[Formula 2]}$$

wherein

M1 is Al or Mn, M2 is selected from the group consisting of B, Ba, Ce, Cr, F, Mg, V, Ti, Fe, Zr, Zn, Si, Y, Nb, Ga, Sn, Mo, W, P, Sr and combinations thereof, M' includes at least one selected from cations of alkali metals, alkaline earth metals, transition metals, and rare earth metals, and a', x', y', z', t' and q' satisfy $0.9 \le a' \le 1.3$, $0.5 \le x' \le 1.0$, $0.0 \le y' \le 0.2$, $0.0 \le z' \le 0.2$, $0.0 \le t' \le 0.2$, and $0.0 < q' \le 0.1$, respectively.

In one embodiment, a and/or a' may be 0.9 to 1.2, or 0.9 to 1.1.

More preferably, M and/or M' may include at least one selected from Li, Ca, Mg, Al, and Zr.

More preferably, q and/or q' may be 0.001 or more, 0.002 or more, 0.003 or more, 0.004 or more, 0.005 or more, 0.05 or less, 0.04 or less, 0.03 or less, or 0.02 or less, or 0.003 to 0.03, 0.005 to 0.02, or 0.01 to 0.02.

More preferably, the fluorine-based compound is present in an amount of 0.1 mol % or more, 0.2 mol % or more, 0.3 mol % or more, 0.4 mol % or more, 0.5 mol % or more, 5 mol % or less, 4 mol % or less, 3 mol % or less, or 2 mol % or less, or is present in an amount of 0.3 mol % or more and 3 mol % or less, 0.5 mol % or more and 2 mol % or less, or 1 mol % or more and 2 mol % or less, based on the total mol % of metals excluding lithium.

In the present invention, it was found that the effects of greatly suppressing cation mixing, strengthening the structure through fluorine replacing oxygen, and suppressing gas generation during high-temperature storage can be obtained by adjusting the doping content to the level defined above, along with a specific process and specific doping material.

In one embodiment, the average crystallite size in the lithium nickel-based composite oxide may be 40 nm or more, 41 nm or more, 42 nm or more, 43 nm or more, or 50 nm or less. The present invention is capable of increasing the energy density per volume and of improving battery characteristics such as lifespan by controlling the doping content to the level defined above along with a specific process and specific doping material to increase the crystallite size.

In one embodiment, the secondary particle includes a surface portion and an inside portion. The present invention is capable of providing a lithium nickel-based composite oxide including secondary particles that have surface and inside portion distinguished from each other based on the technical characteristics described below by adjusting the doping content to a predetermined level along with a specific process and a specific doping material. When a predetermined amount of compound is doped depending on predetermined heat treatment temperature and reaction time, the surface portion of the secondary particle may be mainly doped with the fluorine-based compound.

At this time, the surface portion of the secondary particle means an area of 2 μm to 3 μm extending from the outermost periphery of the secondary particle and the inside portion of the secondary particle means an area excluding the surface portion of the secondary particle.

In one embodiment, the average size of primary particles in the surface portion of the secondary particle may be greater than the average size of primary particles in the inside portion thereof.

In one embodiment, primary particles having a size of not less than 200 nm and less than 500 nm in the inside portion of the secondary particle may be present in an amount of 50 to 100%, 70 to 100%, or 100% by volume with respect to primary particles constituting the inside portion of the secondary particle.

In one embodiment, primary particles having a size of not less than 200 nm and less than 300 nm in the inside portion of the secondary particle may be present in an amount of 50 to 100% by volume, 70 to 100% by volume, or 100% by volume, with respect to primary particles constituting the inside portion of the secondary particle.

In one embodiment, the average size of the primary particles in the inside portion of the secondary particle may be 200 to 500 nm, 200 to 300 nm, or 200 to 250 nm.

In one embodiment, primary particles having a size of 500 nm to 10 μm in the surface portion of the secondary particle may be present in an amount of 50 to 100% by volume, 70 to 100% by volume, or 100% by volume, with respect to primary particles constituting the surface portion of the secondary particles.

In one embodiment, primary particles having a size of 1 μm to 10 μm in the surface portion of the secondary particle may be present in an amount of 50 to 100% by volume, 70 to 100% by volume, or 100% by volume, with respect to primary particles constituting the surface portion of the secondary particle.

In one embodiment, the average size of the primary particles in the surface portion of the secondary particle may be not less than 500 nm and not more than 2 μm, not less than 800 nm and not more than 1.5 μm, or not less than 1.0 μm and not more than 1.2 μm.

In one embodiment, the average size of the primary particles in the surface portion of the secondary particle may be 1.2 times, 1.5 times, 2.0 times, or 3.0 times greater than the average size of the primary particles in the inside portion of the secondary particle.

In one embodiment, an average aspect ratio of the primary particles in the surface portion of the secondary particle may be greater than an average aspect ratio of the primary particles in the inside portion of the secondary particle.

As used herein, the term "aspect ratio" means a ratio of the length of the longest axis/the length of the shortest axis.

In one embodiment, the average aspect ratio of the primary particles of the surface portion of the secondary particle may be 2.0 or more, 2.4 or more, 2.7 or more, 3.0 or more, or 20.0 or less.

In one embodiment, the average aspect ratio of the primary particle in the inside portion of the secondary particle may be not less than 1.0, more than 1.0, not less than 1.2, more than 1.2, less than 2.0, not more than 1.5, or less than 1.5.

In one embodiment, the average aspect ratio of the primary particles on the surface of the secondary particle may be at least 2.0 times greater, at least 2.4 times greater, or at least 10.0 times less than the average aspect ratio of the primary particles in the inside portion of the secondary particle.

In the lithium nickel-based composite oxide according to one embodiment of the present invention, the concentration of fluorine anions doped into the surface portion of the secondary particle may have a predetermined gradient.

In one embodiment, 50% or more of the primary particles of the surface portion of the secondary particle may have a long axis at an angle of ±30° or less from a line connecting the surface of the secondary particle to the center of the secondary particle.

In one embodiment, 50% or more of the primary particles of the surface portion of the secondary particle may have a lithium ion diffusion path formed in the primary particle at an angle of ±30° or less formed from the line connecting the surface of the secondary particle to the center of the secondary particle.

In the present invention, the lithium ion diffusion path formed in the primary particles of the lithium nickel-based composite oxide is formed parallel to the long axis direction of the primary particles, thereby improving the diffusion of lithium ions based on the lithium nickel-based composite oxide.

In one embodiment, the secondary particle may have a max peak intensity at 684.3 eV to 685.0 eV as determined by analysis of a fluorine is binding energy by X-ray photoelectron spectroscopy (XPS). The result of the XPS analysis showed that F mainly exists in the surface portion of the secondary particle. In particular, the result of binding energy analysis showed that the F properly replaced the O site.

Meanwhile, the cause of deterioration in lifespan or battery characteristics during high-temperature storage is directly associated with the phenomenon in which oxygen is detached from the nickel-based positive electrode active material, particularly high-nickel positive electrode active materials. The result of the XPS analysis mean that the present invention is effective in suppressing deterioration in lifespan or detachment of oxygen during high-temperature storage.

Meanwhile, lithium, the main raw material of the positive electrode active material, is highly volatile at high temperatures. Therefore, reaction with lithium at a high temperature for a long time to prepare a positive electrode active material may cause various types of lattice defects as the stoichiometric ratio of lithium/transition metal is changed, thus resulting in deterioration of characteristics such as capacity/lifespan. In particular, a high-nickel positive electrode active material containing a large amount of Ni to realize high capacity may cause many defects due to such high-temperature firing. When the amount of Li in the structure changes during firing, the oxidation state of Ni relates to the reduction from +3 to +2. Therefore, in order to solve this problem, the firing maintenance temperature should be lowered as much as possible and the reaction initiation temperature of lithium should be lowered as much as possible. When the reaction initiation temperature of lithium is lowered, the residual lithium content may also be lowered.

In the present invention, by adjusting the content of a certain fluorine-based compound within a predetermined range, the lithium reaction initiation temperature is lowered and thus the content of residual lithium (Li) present in the form of LiOH and $Li_2CO_3$ is reduced.

In one embodiment, the content of residual lithium (Li) present in the form of LiOH in the surface portion of the secondary particle may be 11,300 ppm or less, or 11,000 ppm or less.

In addition, in one embodiment, the content of residual lithium (Li) present in the form of $Li_2CO_3$ in the surface portion of the secondary particle may be 6,000 ppm or less, 5,000 ppm or less, or 3,000 ppm or less.

In one embodiment, the positive electrode active material may further include a coating oxide that occupies at least a part of at least one of surfaces of the secondary particle, grain boundaries between the primary particles, or surfaces of the primary particles.

In an embodiment, the coating oxide may be represented by Formula 3 below:

$Li_pM3_qO_r$ [Formula 3]

wherein M3 includes at least one selected from the group consisting of Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Gd and Nd, and p, q, and r satisfy $0 \le p \le 10$, $0 < q \le 8$, and $2 \le r \le 13$, respectively.

For example, in Formula 3, M3 may represent a coating element, and the coating oxide may be a composite oxide of lithium and an element represented by M3, or an oxide of M3.

For example, the coating oxide may be $Li_pCo_qO_r$, $Li_pW_qO_r$, $Li_pZr_qO_r$, $Li_pTi_qO_r$, $Li_pNi_qO_r$, $Li_pAl_qO_r$, $Li_pMo_qO_r$, $Co_qO_r$, $Al_qO_r$, $W_qO_r$, $Zr_qO_r$, $B_qO_r$, $Li_p(W/Ti)_qO_r$, $Li_p(W/Zr)_qO_r$, $Li_p(W/Ti/Zr)_qO_r$, or $Li_p(W/Ti/B)_qO_r$, but is not limited thereto.

The coating oxide may include a concentration gradient portion in which a molarity of an element included in the coating oxide is changed. For example, when the coating oxide includes lithium, the molarity of lithium may be changed. Also, for example, the molarity of one or more of M3 included in the coating oxide may be changed.

In one embodiment, when the coating oxide occupies at least a part of the surface portion of the primary particle constituting the outermost periphery of the secondary particle, the concentration gradient may decrease, or increase, or increase then decrease in the direction toward the center of the secondary particle from the surface of the primary particle constituting the outermost periphery of the secondary particle.

In addition, the concentration gradient may decrease, or increase, or increase then decrease in the direction toward the center of the primary particle from the surface of the primary particle constituting the outermost periphery of the secondary particle.

In one embodiment, when the coating oxide occupies at least a part of the surface portion of the primary particle that does not form the outermost periphery of the secondary particle, it may decrease, or increase, or increase then decrease in the direction toward the center of the primary particle from the surface of the primary particle.

In addition, the technical features of primary particles and secondary particles of lithium nickel-based composite oxide may relate to average characteristics of a plurality of particles.

Meanwhile, the meaning of "≤", "not less than" or "not more than" described herein may be interchangeable with the meaning of "<", "more than" or "less than".

In another aspect, the present invention provides a positive electrode including the positive electrode active material.

The positive electrode is manufactured to have a known structure in accordance with a known manufacturing method, except that the positive electrode active material is used. The binder, conductive material, and solvent are not particularly limited as long as they can be used for a positive electrode current collector for secondary batteries.

In another aspect, the present invention provides a secondary battery including the positive electrode active material.

Specifically, the secondary battery may include a positive electrode, a negative electrode positioned opposite to the positive electrode, and an electrolyte interposed between the positive electrode and the negative electrode, but the configuration thereof is not particularly limited thereto as long as it can be used as a secondary battery.

Hereinafter, embodiments of the present invention will be described in more detail.

Manufacture of Positive Electrode Active Material

Example 1

First, nickel sulfate, cobalt sulfate, and manganese sulfate were prepared and were then coprecipitated to synthesize a $NiCoMn(OH)_2$ hydroxide precursor (Ni:Co:Mn=90:8:2 (at %)).

LiOH(Li/(Ni+Co+Mn) mol ratio=1.04) and a fluorine-based compound were added in various amounts to the synthesized precursor, followed by firing to prepare a lithium composite oxide. In this case, the precursor was mixed with LiOH and the fluorine-based compound, and then the temperature was raised at 2° C./minute while maintaining an $O_2$ atmosphere in a furnace, followed by heat treatment at 665° C. for 10 hours and then natural cooling.

The fluorine-based compounds added in Examples were LiF, $CaF_2$, $AlF_3$, $MgF_2$, $NH_4F$, and $ZrF_4$, and were added in various amounts of 0.2 mol %, 0.5 mol %, 1 mol %, 2 mol %, 3 mol %, 4 mol %, and 5 mol %, based on the total molar content of metals excluding lithium.

Example 2

The positive electrode active material prepared in Example 1 was mixed with 0.6 mol %, 0.6 mol %, and 0.1 mol % of $TiO_2$, $Al_2O_3$, and $ZrO_2$, respectively, the temperature was raised at 4.4° C./minute while maintaining the 02 atmosphere in a furnace, and the result was subjected to heat treatment at 675° C. for 8 hours and naturally cooled to obtain a lithium composite oxide.

The obtained lithium composite oxide was washed with distilled water for 1 hour and the washed lithium composite oxide was filtered and then dried.

Then, the dried lithium composite oxide was mixed with a B-containing raw material ($H_3BO_3$) using a mixer. The B-containing raw material ($H_3BO_3$) was mixed in an amount of 0.235% by weight, based on the total weight of the lithium composite oxide. The temperature was raised at 4.4° C./minute while maintaining the $O_2$ atmosphere in the furnace, and the result was heat-treated at 300° C. for 8 hours, and then cooled naturally.

Comparative Example 1

A positive electrode active material was prepared in the same manner as in Example 1, except that the fluorine-based compound was not added.

Comparative Example 2

A positive electrode active material was prepared in the same manner as in Example 2, except that the positive electrode active material not containing a fluorine-based compound prepared in Comparative Example 1 was mixed with $TiO_2$, $Al_2O_3$, and $ZrO_2$.

Manufacture of Lithium Secondary Battery 94 wt % of each of the positive electrode active materials prepared in Examples and Comparative Examples, 3 wt % of artificial graphite, and 3 wt % of PVDF were dispersed in 3.5 g of N-methyl-2 pyrrolidone (NMP). The positive electrode slurry was applied to a 15 μm thick aluminum (Al) thin film as a positive electrode current collector, followed by drying and roll-pressing to prepare a positive electrode. The loading level of the positive electrode was 7 mg/cm$^2$ and the electrode density was 3.2 g/cm$^3$.

A coin battery was manufactured using lithium foil as a counter electrode for the positive electrode using a porous polyethylene film (Celgard 2300, thickness: 25 μm) as a separator and an electrolyte solution of 1.15 M $LiPF_6$ in a solvent containing ethylene carbonate and ethyl methyl carbonate mixed in a volume ratio of 3:7.

Experimental Example (1) Cross-Sectional SEM Image

The cross-sections of the positive electrode active materials according to Example 1 and Comparative Example 1 were obtained using a cross-section polisher at a current of 380 ρA for 1 hour and 30 minutes. The cross-sectional SEM image of the lithium composite oxide was obtained using FE-SEM at a voltage of 2 kV using a JSM-7610FPlus (JEOL), and the result is shown in FIG. 1.

(2) Average Crystallite Size

Figure 2:
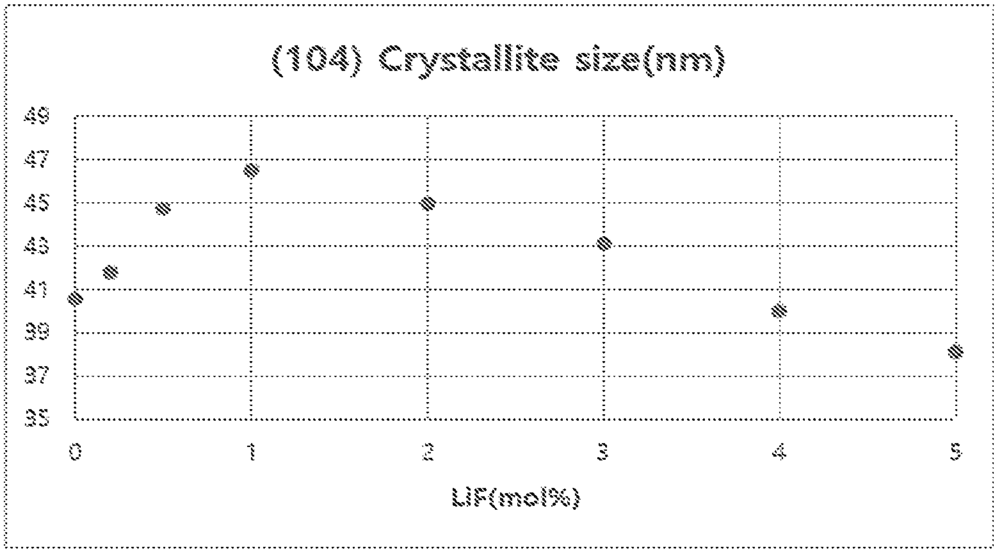
FIG. 2 shows the result of crystallite size analysis for the positive electrode active materials according to Comparative Examples and Examples of the present invention.

The average crystallite sizes of the positive electrode active materials according to Example 1 and Comparative Example 1 were measured and the result is shown in FIG. 2. The crystallite size was obtained by X-ray diffraction (XRD) analysis to obtain a peak attributed to the crystal plane of the lithium composite oxide included in the positive electrode active material. XRD analysis was measured at 0.02°/step in the range of 2θ of 10 to 80° using a Bruker D8 advance diffractometer using Cu-Kα radiation (1.540598 Å) to obtain $FWHM_{corrected(104)}$ in accordance with the following Equation, and then the $FWHM_{corrected\ (104)}$ was converted to a crystallite size through the Scherrer equation, which is shown in FIG. 2.

$$FWHM_{corrected(104)}=FWHM_{measured(104)}-FWHM_{Si\ powder(220)} \quad \text{[Equation 1]}$$

wherein $FWHM_{(104)}$ represents the full width at half maximum (FWHM; deg., 2θ) of the (104) peak in the XRD peak defined by the hexagonal lattice having the R-3m space group.

In Equation 1, the $FWHM_{measured(104)}$ represents the half width of the (104) peak observed at 44.5±1.0° (2θ) in the XRD analysis of the lithium nickel-based composite oxide, and the $FWHM_{Si\ powder(220)}$ means the full width at half maximum of the (220) peak observed at about 47.3±1.0° (2θ) in the XRD measurement of the Si powder.

The full width at half maximum (FWHM) of the lithium nickel-based composite oxide according to the present invention has deviations and errors due to various variables such as the condition of the analysis equipment, X-ray source, and measurement conditions. As shown in Equation 1 above, full width at half maximum (FWHM) of the lithium nickel-based composite oxide was corrected with the full width at half maximum (FWHM) of Si powder as a standard sample. The measurement of $FWHM_{(104)}$ and $FWHM_{Si\ powder\ (220)}$ was performed by fitting a Gaussian function and the fitting of the Gaussian function for FWHM measurement can be performed using various academic/public/commercial software known to those skilled in the art.

Meanwhile, the Si powder used herein was Si powder from Sigma-Aldrich (product number 215619).

(3) XPS Analysis

Figure 3:
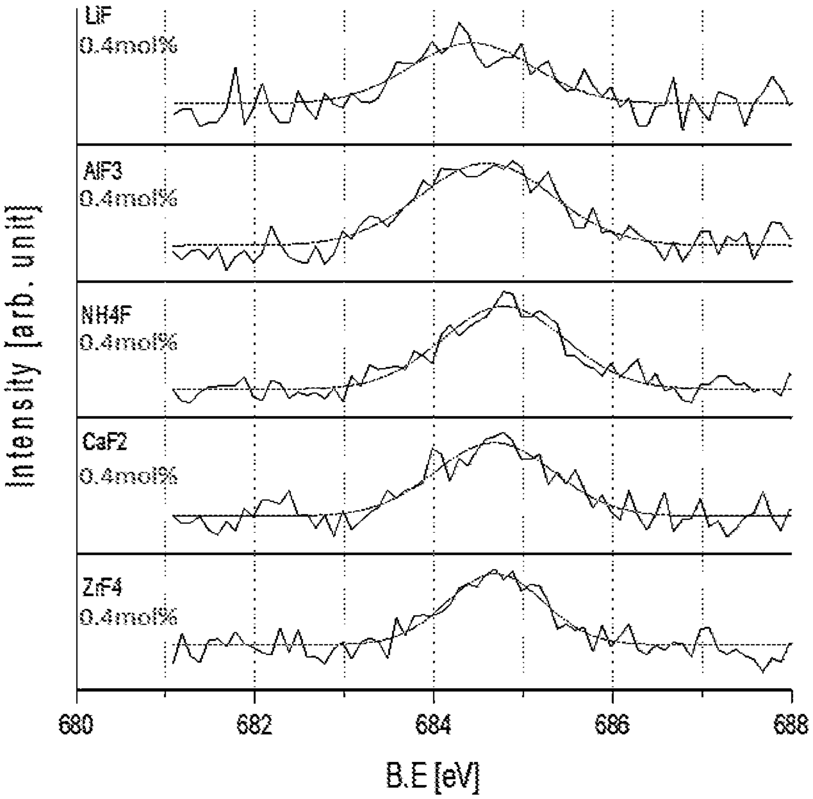
FIG. 3 shows the result of XPS analysis of the positive electrode active materials according to Comparative Examples and Examples of the present invention.

The positive electrode active materials according to Example 1 and Comparative Example 1 were subjected to XPS analysis. In the XPS analysis, the fluorine Is binding energy included in the lithium composite oxide was measured through Nexsa (Thermo Fisher) (minimum analysis area: 10 to 200 μm) using Al—Kα radiation and the result is shown in FIG. 3.

(4) Analysis of Reaction Initiation Temperature

Figure 4:
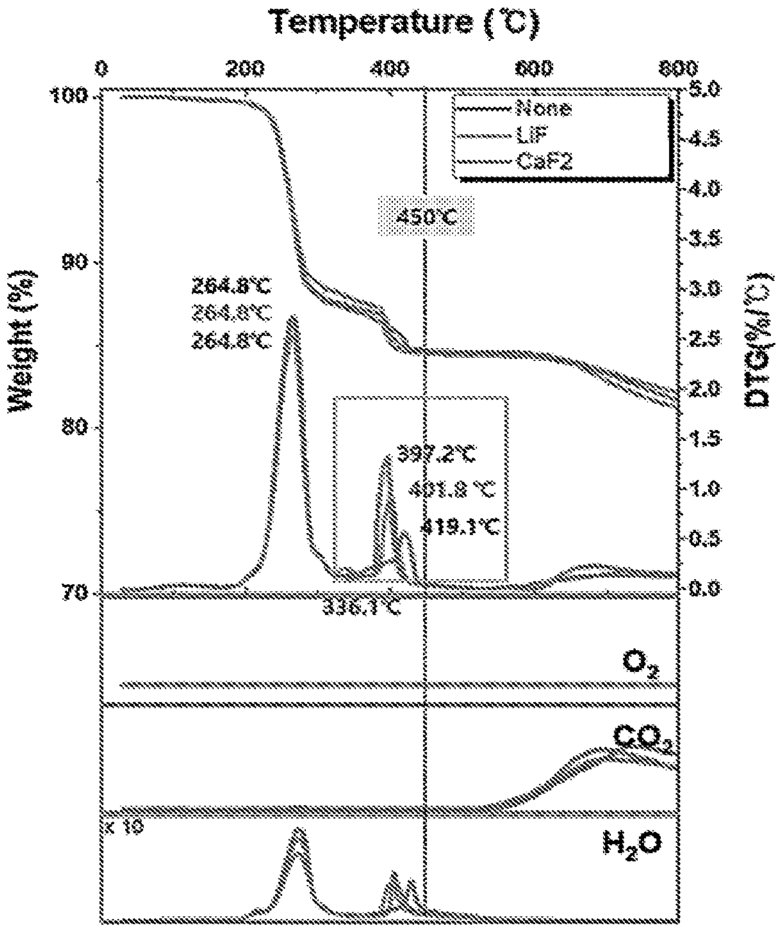
FIG. 4 shows the result of reaction initiation temperature analysis when preparing positive electrode active materials according to Comparative Examples and Examples of the present invention.

The positive electrode active materials according to Example 1 and Comparative Example 1 were subjected to analysis of the reaction initiation temperature of lithium and the result is shown in FIG. 4.

(5) Analysis of Amount of Generated Gas

Figure 5:
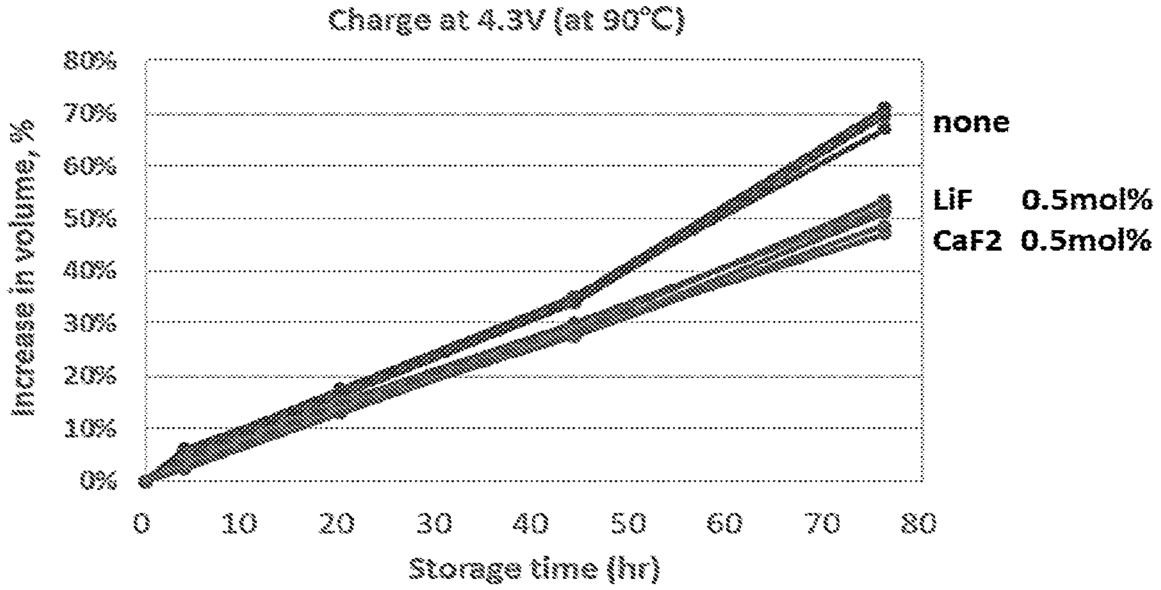
FIG. 5 shows the result of gas generation analysis upon storage at 90° C. of batteries according to Comparative Examples and Examples of the present invention.

The lithium secondary batteries according to Example 2 and Comparative Example 2 were charged to 4.25V at a constant current of 0.2C and then stored at 60° C. for 80 hours, the change in volume of the lithium secondary battery due to gas generation in the lithium secondary battery was measured to determine a volume increase rate, which is an indicator of gas generation, and the result is shown in FIG. 5.

(6) C-Rate Efficiency Analysis

Figure 6:
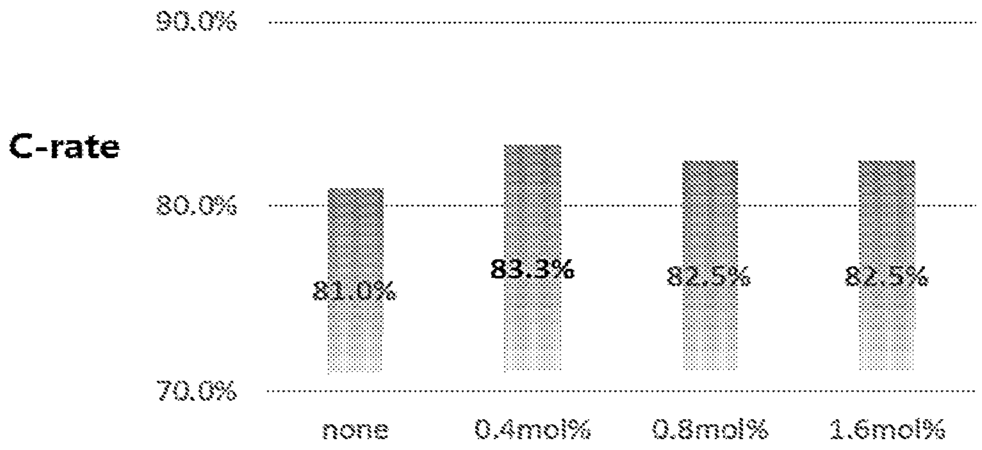
FIG. 6 shows the result of c-rate analysis of batteries according to Comparative Examples and Examples of the present invention.

The C-rate efficiency at 5.0C/0.1C of lithium secondary batteries according to Example 2 and Comparative Example 2 was measured at a discharge rate of 25° C. and at a voltage of 3.0V to 4.3V using an electrochemical analyzer (Togo, Toscat-3100) and the result is shown in FIG. 6.

(7) Analysis of Residual Lithium

Figure 7:
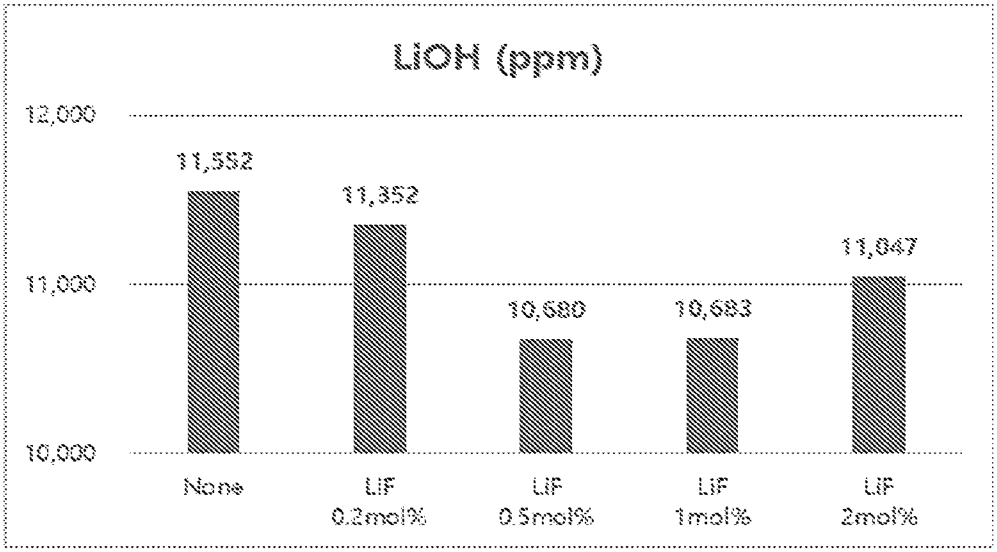
FIG. 7 shows the result of LiOH content analysis for the positive electrode active material according to Comparative Examples and Examples of the present invention.
Figure 8:
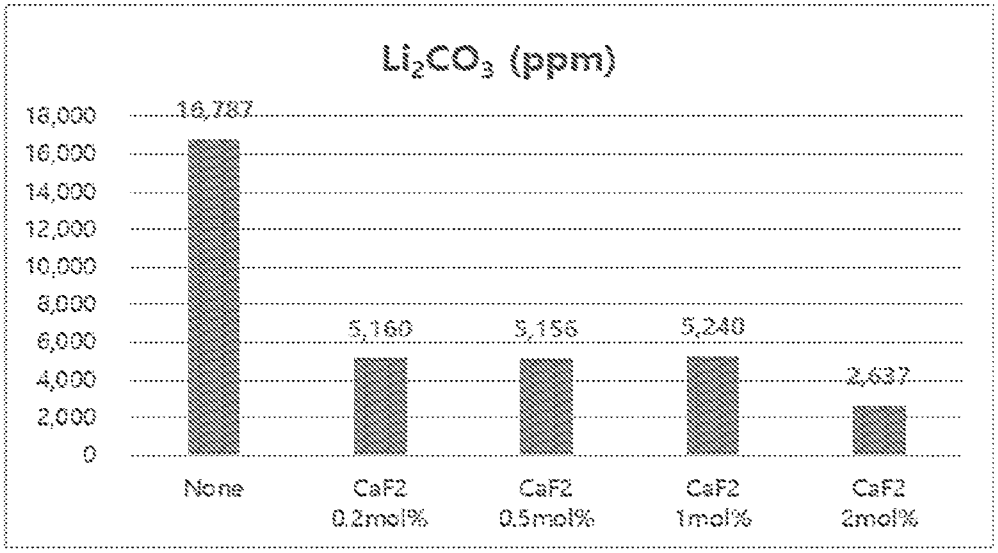
FIG. 8 shows the result of $Li_2CO_3$ content analysis for the positive electrode active materials according to Comparative Examples and Examples of the present invention.

Residual lithium was measured by the amount of 0.1M HCl used until the pH reached 4 by pH titration. First, 5 g of each of the positive electrode active materials according to Example 1 and Comparative Example 1 was added to 100 ml of DIW, followed by stirring for 15 minutes and filtering. 0.1 M HCl was added to 50 ml of the filtered solution, HCl consumption depending on a change in pH was measured to determine Q1 and Q2, unreacted LiOH and $Li_2CO_3$ were calculated in accordance with the following Formulas, and the results are shown in FIGS. 7 and 8.

M1=23.95(LiOH Molecular weight)

M2=73.89($Li_2CO_3$ Molecular weight)

SPL Size=(Sample weight×Solution Weight)/Water Weight

LiOH(wt %)=[(Q1−Q2)×C×M1×100]/(SPL Size×1000)

$Li_2CO_3$(wt %)=[2×Q2×C×M2/2×100]/(SPL Size×1000)

As apparent from the foregoing, the present invention provides a positive electrode active material that has effects of suppressing cation mixing and of strengthening the structure based on fluorine replacing oxygen.

The present invention provides a positive electrode active material, specifically, a Hi-nickel positive electrode active material that has effects of greatly reducing lattice defects and residual lithium generated during high-temperature reactions.

The present invention provides a positive electrode active material that has effects of improving the lifespan of a battery and of greatly inhibiting gas generation during high-temperature storage.

The present invention provides a positive electrode active material that has effects of greatly improving battery characteristics such as capacity/efficiency and C-rate.

Although the preferred embodiments of the present invention have been disclosed, those skilled in the art will appreciate that various modifications, additions and substitutions are possible, without departing from the scope and spirit of the invention as disclosed in the accompanying claims.

What is claimed is:

1. A positive electrode active material comprising a lithium nickel-based composite oxide including secondary particles formed by aggregation of one or more primary particles, wherein a part of cations and a part of anions in the lithium nickel-based composite oxide are substituted, respectively, with cations M' and fluorine anions ($F^-$) in a fluorine-based compound, and wherein the secondary particle comprises a surface portion and an inside portion, wherein an average size of primary particles of the surface portion of the secondary particle is greater than that of the inside portion of the secondary particle.

2. The positive electrode active material according to claim 1, wherein the fluorine-based compound comprises at least one selected from LiF, $CaF_2$, $MgF_2$, $AlF_3$, and $ZrF_4$.

3. The positive electrode active material according to claim 1, wherein primary particles having a size of not less than 200 nm and less than 500 nm in the inside portion of the secondary particle are present in an amount of 50 to 100% by volume with respect to primary particles constituting the inside portion of the secondary particle.

4. The positive electrode active material according to claim 1, wherein primary particles having a size of 500 nm to 10 μm in the surface portion of the secondary particle are present in an amount of 50 to 100% by volume with respect to primary particles constituting the surface portion of the secondary particle.

5. The positive electrode active material according to claim 1, wherein an average aspect ratio of the primary particles in the surface portion of the secondary particle is greater than an average aspect ratio of the primary particles in the inside portion of the secondary particle.

6. The positive electrode active material according to claim 1, wherein 50% or more of the primary particles of the surface portion of the secondary particle have a long axis at an angle of ±30° or less from a line connecting the surface of the secondary particle to the center of the secondary particle.

7. The positive electrode active material according to claim 1, wherein 50% or more of the primary particles of the surface portion of the secondary particle have a lithium ion diffusion path formed in the primary particle at an angle of ±30° or less from the line connecting the surface of the secondary particle to the center of the secondary particle.

8. The positive electrode active material according to claim 1, wherein the secondary particle have a max peak intensity at 684.3 eV to 685.0 eV as determined by analysis of a fluorine 1s binding energy by X-ray photoelectron spectroscopy (XPS).

9. The positive electrode active material according to claim 1, further comprising:

a coating oxide that occupies at least a part of at least one of surfaces of the secondary particle, grain boundaries between the primary particles, or surfaces of the primary particles.

10. A positive electrode comprising the positive electrode active material according to claim 1.

11. A secondary battery comprising the positive electrode according to claim 10.

* * * * *